(12) United States Patent
Motta et al.

(10) Patent No.: US 7,958,502 B2
(45) Date of Patent: Jun. 7, 2011

(54) EFFICIENT GENERATOR OF UPDATE PACKAGES FOR MOBILE DEVICES THAT USES NON-ELF PREPROCESSING

(75) Inventors: Giovanni Motta, Dana Point, CA (US); Shao-Chun Chen, Irvine, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1339 days.

(21) Appl. No.: 11/500,754

(22) Filed: Aug. 7, 2006

(65) Prior Publication Data

US 2007/0067765 A1 Mar. 22, 2007

Related U.S. Application Data

(60) Provisional application No. 60/705,891, filed on Aug. 5, 2005.

(51) Int. Cl.
*G06F 9/44* (2006.01)
(52) U.S. Cl. ......... 717/168; 717/170; 717/176; 717/177
(58) Field of Classification Search ........................ None
See application file for complete search history.

(56) References Cited

U.S. PATENT DOCUMENTS

| | | | | |
|---|---|---|---|---|
| 5,805,899 | A * | 9/1998 | Evans et al. | 717/170 |
| 6,077,315 | A * | 6/2000 | Greenbaum et al. | 717/157 |
| 6,526,574 | B1 * | 2/2003 | Jones | 717/168 |
| 6,542,906 | B2 * | 4/2003 | Korn | 1/1 |
| 6,779,177 | B1 * | 8/2004 | Bahrs et al. | 717/173 |
| 7,313,791 | B1 * | 12/2007 | Chen et al. | 717/170 |
| 7,555,750 | B1 * | 6/2009 | Lilley | 717/168 |
| 7,657,886 | B1 * | 2/2010 | Chen et al. | 717/170 |
| 7,673,300 | B2 * | 3/2010 | Herle et al. | 717/169 |
| 7,739,679 | B2 * | 6/2010 | Qumei | 717/170 |
| 2004/0073912 | A1 * | 4/2004 | Meza | 719/321 |
| 2004/0133887 | A1 * | 7/2004 | Herle et al. | 717/171 |
| 2005/0114852 | A1 * | 5/2005 | Chen et al. | 717/168 |
| 2005/0278715 | A1 * | 12/2005 | Herle et al. | 717/162 |
| 2006/0015860 | A1 * | 1/2006 | Liu et al. | 717/162 |
| 2006/0036874 | A1 * | 2/2006 | Cockerille et al. | 713/187 |
| 2006/0080635 | A1 * | 4/2006 | Anwar et al. | 717/100 |
| 2006/0080681 | A1 * | 4/2006 | Anwar et al. | 719/331 |
| 2007/0028226 | A1 * | 2/2007 | Chen et al. | 717/168 |
| 2007/0132774 | A1 * | 6/2007 | Fan et al. | 345/564 |

OTHER PUBLICATIONS

"Karnel Korner: The ELF Object File Format:Introduction", Erick Youngdale, Apr. 1995, pp. 1-6, <http://portal.acm.org/citation.cfm?id=324805.324812&coll=DL&dl=GUIDE&CFID=8503614&CFTOKEN=21527465>.*

"ELF An Efficient Log Structure Flash File System For micro Sensor System", Hui Dai et al., SenSys 04 Proceeding of the $2^{nd}$ international conference on Embedded networked sensor system, 2004, pp. 1-12, <http://portal.acm.org/citation.cfm?id=1031495.1031516&coll=DL&dl=GUIDE&CFID=8503614&CFTOKEN=21527465>.*

"A Lightweight Dynamic Operating System for Tightly Constrained Wireless Sensor Platforms", Yu Ting Chen et al., 2010, Dpt. of CS National Tsing Hua university, pp. 1-14, <http://newport.eecs.uci.edu/~chou/sensys10.pdf>.*

* cited by examiner

*Primary Examiner* — Thuy Dao
*Assistant Examiner* — Ziaul A. Chowdhury

(57) ABSTRACT

An efficient generator for update packages employs one of two possible schemes to perform preprocessing when an ELF file or other similar information is not available. The first technique embeds the preprocessing in the generator loop and does not rely on the knowledge of the architecture. The second technique, called node list technique, needs to know the syntax of the assembly instructions used by the executable.

7 Claims, 5 Drawing Sheets

205

```
// B is the block being copied from V1
// Base_addr (B) bytes are copied from Base_addr (B) to Base_addr (B) + Offset(B)

Encode command [COPY Base_addr (B) Length(B)]

Add to the table M, entry (Base_addr (B), Length(B), Offset(B))

for each reference R found in the block B {
    if R is in the range [Base_addr (B), Base_addr (B) + Length(B) - 1]
        if R is relative {
            Do Nothing                    // Relative in block, no need to map
        } else {
            Replace R with R + Offset(B)  // Absolute in block, already mapped
        }
    } else {
        if R is found in M, let Offset be the corresponding offset {
            Replace R with R + Offset     // Absolute out of block
        } else {
            Do Nothing                    // Not mapped yet
        }
    }
}

// SET_PTR add any unmapped reference or change the mapping of existing
references
for each mismatch D between B and B' {
    Encode command [SET_PTR], [SET_PTR_CACHE] or [SET_PTR_DELTA]
    if mismatch D corresponds to a reference R {
        Add R to the table M              // See algorithm in Figure 2
    }
}
```

Figure 2

305 

```
// R = (Addr_old, Addr_new) is the reference being added to M
if there is an R' = (Base_addr, Length, Offset) in M such that
    (Addr_old >= Base_addr) && (Addr_old < Base_addr + Length - 1)
&&
    (Addr_new != Addr_old - Base_addr + Offset) {
    if Length == 1 {
        Replace R' in M with (Addr_old, 1, Addr_new - Addr_old)
    } else {
        Remove R' from M
        Insert (Base_addr, Addr_old - Base_addr, Offset) in M
        Insert (Addr_old, 1, Addr_new - Addr_old) in M
        Insert (Addr_old + 1, Length - (Addr_old - Base_addr) - 1,
Offset) in M
        // Last two entries could be replaced by
        //      (Addr_old + 1, Length - (Addr_old - Base_addr),
Addr_new - Addr_old)
    }
} else {
    Insert (Addr_old, 1, Addr_new - Addr_old) in M
    Merge new entry with adjacent entries in M having the same
offset
}
```

Figure 3

EFFICIENT GENERATOR OF UPDATE PACKAGES FOR MOBILE DEVICES THAT USES NON-ELF PREPROCESSING

FEDERALLY SPONSORED RESEARCH OR DEVELOPMENT

[Not Applicable]

MICROFICHE/COPYRIGHT REFERENCE

[Not Applicable]

The present application claims priority to, and is based on, provisional U.S. patent application Ser. No. 60/705,891 entitled "AN EFFICIENT GENERATOR OF UPDATE PACKAGES FOR MOBILE DEVICES THAT USES NON-ELF PREPROCESSING", filed Aug. 05, 2005, which is hereby incorporated by reference in its entirety.

The present application is related to U.S. Utility patent application Ser. No. 11/124,866 titled "TRANSPARENT LINKER PROFILER TOOL WITH PROFILE DATABASE" now U.S. Pat. No. 7,689,982 issued on Mar. 30, 2010, and U.S. Utility patent application Ser. No. 11/316,291 titled "MOBILE HANDSET NETWORK WITH SUPPORT FOR COMPRESSION AND DECOMPRESSION IN THE MOBILE HANDSET" now U.S. Pat. No. 7,814,474 issued on Oct. 12, 2010, both of which are incorporated by reference in their entirety.

The present application is related to PCT Application with publication number WO/02/41147 A1, PCT number PCT/US01/44034, filed 19 Nov. 2001, which in turn is based on a provisional application 60/249,606 filed 17, Nov. 2000, both of which are incorporated by reference in their entirety.

BACKGROUND OF THE INVENTION

1. Field of the Invention

The present invention relates generally to the generation of update packages by a generator that can be used to update firmware/software components in mobile handsets.

2. Related Art

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

There is a problem with generating update packages in an efficient mode when at least a portion of the content in a mobile phone image is compressed, or encrypted, or both. There is a problem in minimizing the size of an update package that contains a difference information for a code transition between an old version to a new version.

A common problem in the differential compression of executable files is the pointer mismatch due to code relocation. When a block of code is moved from a memory region to another, all pointers to that region will change accordingly. If in the old version a pointer points to an address A and in the new version of the same code, the same pointer points to B, it is likely that other pointers to A will be changed in the new version into pointers to B. Incorporating such issues into a solution is not easy. In addition, automating the generation of update packages when code changes dramatically between an old version and a newer version is still an art form and prone to errors, and therefore needs tweaking.

Efficient encoding of references that are relocated by the same offset in the new software version is necessary, but is a complex problem. One related question is when such encoding needs to be conducted. If a block of code contains mismatches, one problem is to decide if mismatches are individually encoded or not. These and other problems are typically encountered during the generation of an update package.

BRIEF SUMMARY OF THE INVENTION

The present invention is directed to apparatus and methods of generating an update package for mobile devices that are further described in the following Brief Description of the Drawings, the Detailed Description of the Invention, and the Claims. Features and advantages of the present invention will become apparent from the following detailed description of the invention made with reference to the accompanying drawings.

BRIEF DESCRIPTION OF THE DRAWINGS

FIG. 2 provides a pseudocode of the embedded preprocessing technique.

FIG. 3 outlines another algorithm to insert new references into the table.

DETAILED DESCRIPTION OF THE INVENTION

Figure 1:
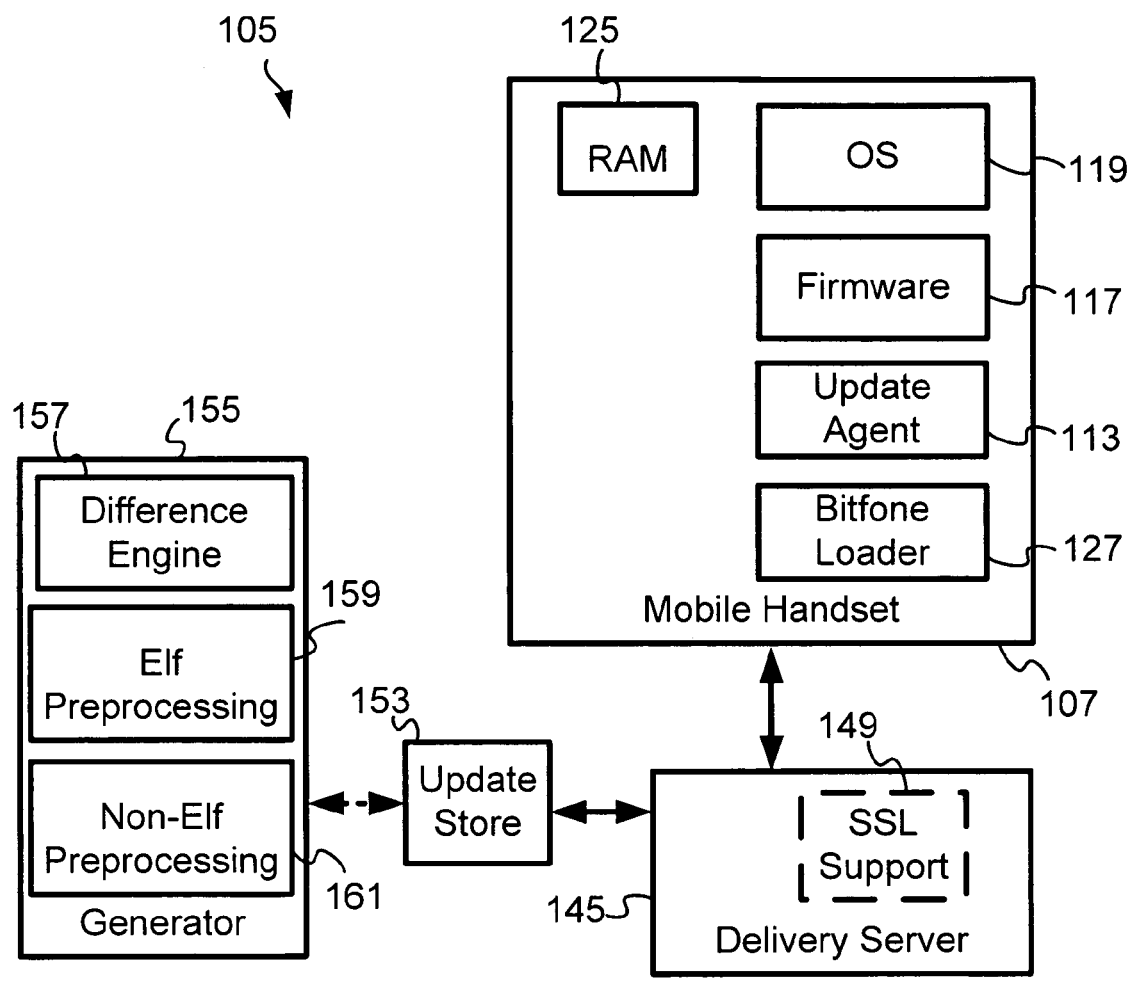
FIG. 1 is a perspective diagram of a mobile handset network that employs a generator to generate update packages and an update agent in a mobile device that is capable of updating firmware and software in mobile device using the update packages.

FIG. 1 is a perspective diagram of a mobile handset network 105 that employs a generator 155 to generate update packages and an update agent 113 in a mobile device 107 that is capable of updating firmware 117 and software 119 in the mobile device 107 using the update packages. The mobile handset network 105 comprises the generator 155 capable of generating update packages that are employed to update firmware 117/software 119 in mobile handsets 107, an update store 153 that acts as a repository of update packages, a delivery server 145 that dispenses update packages and the mobile device 107 that retrieves update packages from the delivery server 145 to update its firmware 117/software 119.

In general, the update agent 113 is resident in an embedded device, such as a mobile handset 107 (cell phones). The update agent 113 is implemented in hardware in one related embodiment, and in software in another related embodiment, and is employed to use an update package to update firmware 117 and/or software 119 resident in non-volatile memory of the mobile handset 107, such as a NAND based flash memory or a NOR based flash memory. The update process is fault tolerant in the mobile handset 107. Typically, a fault tolerant update agent is employed for such update or firmware or software in the mobile handset 107.

The generator 155 comprises a differencing engine 157 that is used to conducting a differencing algorithm to generate a difference information between one version of a firmware or code and another, a elf preprocessing module 159 that is used to pre-process ELF based firmware or code, and a non-elf preprocessing module 161 that is used to pre-process a non- ELF based firmware or code. That is because the mobile handsets comprise of code, such as firmware and OS, that could be ELF-based or NON-ELF based. For example, the mobile handset 107 may comprise of a firmware that is ELF-based or NON-Elf based.

In one embodiment, the efficient generator 155 for update packages employs one of two possible schemes to perform preprocessing when an ELF file or other similar information is not available. The first scheme embeds the preprocessing in the generator loop and does not rely on the knowledge of the architecture. The second method, called node list algorithm, needs to know the syntax of the assembly instructions used by the executable.

The present invention addresses the problem of generating update packages for mobile devices, especially when there is a need to perform preprocessing when an ELF file or other similar information is not available. In particular, it provides a first scheme wherein the generator embeds the preprocessing in the generator loop and does not rely on the knowledge of the architecture of the associated chipset (such as ARM architecture). A second method, called node list technique, employs the syntax of the assembly instructions used by the executable. A simplified node list technique is currently employed in a release of Bitfone's mProve 5.0 and performs consistently close to the ELF-based preprocessing. Both the first method and the second method have been found to be useful for some scenarios.

The generator 155 encodes a software package V2 by finding the smallest set of differences from a reference software package V1. Typically, V2 is a more recent software version than V1, so in the following we will refer to these packages also by the names "new" and "old" respectively. The generator encodes differences with a small set of commands that, when executed by the decoder, reconstruct V2 losslessly. The commands outlined in the generator 155 allow copy of blocks from V1 to V2, insertion of novel data in V2 and small adjustments in a recently copied block (with the use of the commands in the SET_PTR family).

The use of SET_PTR mitigates the well known problem of pointers mismatch due to code relocation. If executable code in V1 appears in V2 in a different memory position, both absolute and relative references may change by making the encoding of a match more expensive.

In one embodiment, the use of cache tables allows an efficient encoding of references that are relocated by the same offset in the new software version. However in the generator 155, nothing is done in order to apply this information at a global level and before the matching. If a block contains mismatches, all mismatches are individually encoded even when some of them could have been easily predicted because they have appeared in past copies. The generator 155 overcomes this problem using preprocessing, and the cost of this preprocessing is factored in during the encoding, it is possible to ensure that the performance of this method is not substantially worse than a global optimization. Another advantage of this method is the low computational burden on the encoder side and the absence of side information sent to the decoder.

During the encoding process in the generator 155, the encoder keeps a table that stores the relocation of the references encountered. This table is updated before each COPY and after each SET_PTR with a method that is explained later. Before a block in $V_1$ is physically copied in $V_2$, the block is scanned for references. All references that are found in the table (i.e. the references for which a possible relocation is known because they have appeared in the past) are changed according to the information in the table. All other references are left unaltered.

After the COPY, any discrepancy between the blocks of the old and the new versions is fixed by the generator 155, with the use of a command of the SET_PTR family. However, in the new scheme, after each SET_PTR a new entry is eventually added to the table.

The decoder mimics the process by decoding a COPY command, adding a new entry in the table, scanning the old block for references and adjusting those that are found in the table. Then, any eventual SET_PTR is decoded and the table updated accordingly. Finally the block is copied in the new version.

The organization of the table comprises three entities or parameters—a base—address, a length and an offset. Thus, the table storing the relocation of the references will consist of triples: [Base_address, Length, Offset].

The meaning of such an entry is that addresses in $V_1$ ranging from Base_address to Base_address+Length−1 have been relocated in $V_2$ in the range that goes from Base_address+Offset to Base_address+Length+Offset−1. In practice, when a reference R falling in the range [Base_address, Base_address+Length−1] is found in $V_1$, the embedded preprocessing replaces R with R'=R+Offset.

In a first approximation, we assume that ranges stored in the table will not overlap. Since the table must be searched frequently for references, the simplest implementation consists of a table sorted by Base_address, so that a binary search can be applied to locate a reference.

A cost function is employed to select among a set of a set of possible matching candidates one that achieves highest compression. In order to achieve a compact representation of the differences between the two software versions, the generator 155 employs a cost function. The purpose of such a cost function is to select among a set of possible matching candidates one that achieves highest compression.

One of the advantages of the embedded preprocessing is that the procedure described in the previous sections can be applied to each matching candidate. Given a set of alternatives in $V_1$ that could be potentially used to encode a matching block in $V_2$, the encoder applies the preprocessing to each of them and carries out a complete encoding in the attempt to estimate which alternative lends itself to a shorter representation.

Beside the obvious advantage of a more compact encoding, this method results into a better estimate of the relocation of the references. This could be sufficient to have good results with an optimization process that is sequential and greedy in nature.

FIG. 2 provides a pseudocode of the embedded preprocessing technique. Both encoder and decoder follow the same procedure, with the encoder trying it on all (or on the set of most promising) matches in $V_1$. After a COPY command an entry in the table M is added. This entry will map a range of references wide as the length of the copy. Conversely, the effect of the entries added by the SET_PTR is to split existing ranges, change existing mappings and/or add mappings of individual references.

FIG. 3 outlines another algorithm to insert new references into the table. An alternative for the split of an existing range is also suggested in a comment. Which alternative is likely to bring highest benefit is determined experimentally based on the architecture.

Figure 4:
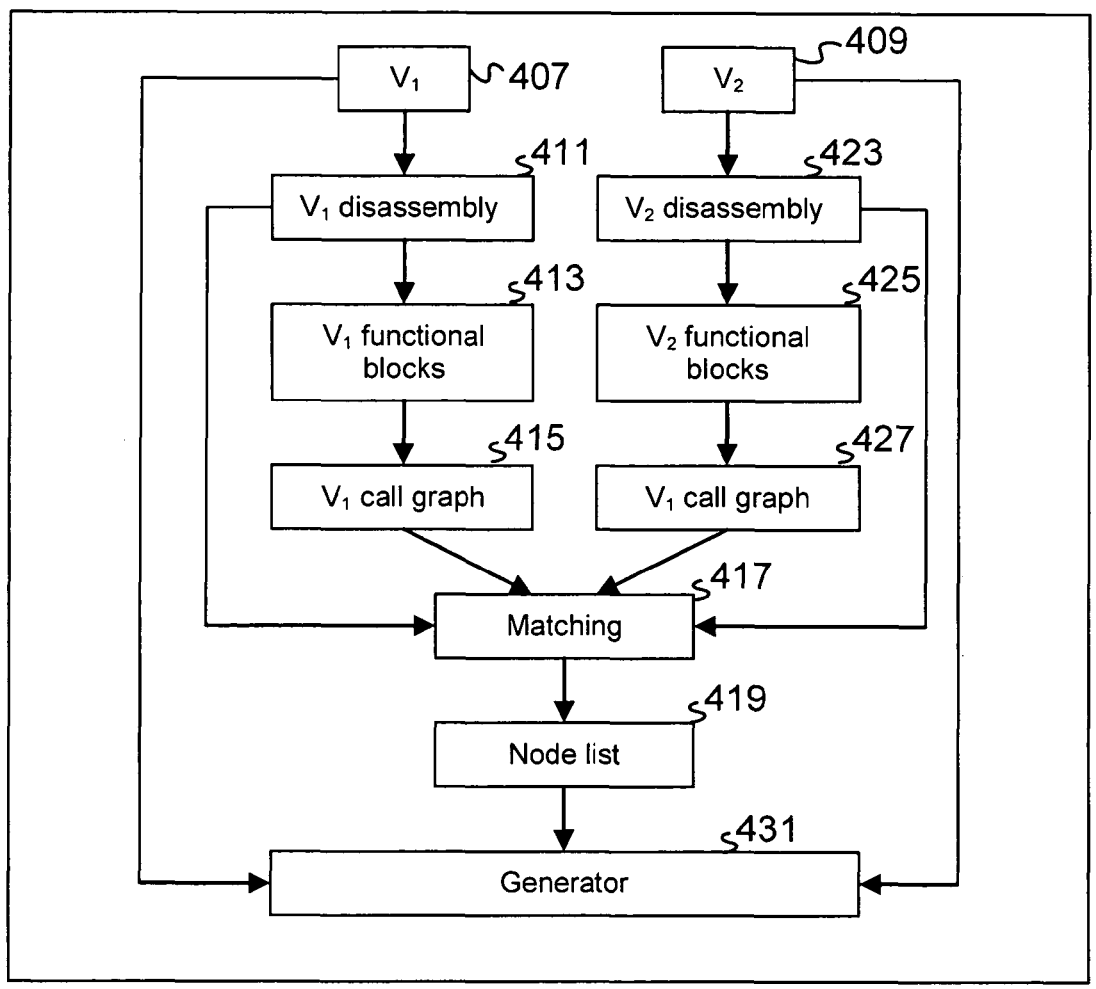
FIG. 4 provides a flow chart that describes the node list technique employed by one embodiment of the generator 155 that takes into account the architecture of the mobile handset.

FIG. 4 provides a flow chart that describes the node list technique employed by one embodiment of the generator 155 that takes into account the architecture of the mobile handset. If the target architecture of $V_1$ and $V_2$ is known, then a partial disassembly of the programs helps to locate entry points and reconstruct part of the info typically present in an ELF file.

The use of other instructions (for example, the ARM instruction LDR) can be used to find the position of the data segments. The process of finding and labeling entry points will partition each program into a sequence of functional blocks, each eventually calling or being called by other functional blocks. This network of references will constitute a structure that we will refer to as call graph. The nodes of a call graph are the functional blocks and the edges are the references between the blocks. Nodes of this graph can be matched between $V_1$ and $V_2$ to verify the correctness of the findings and provide the generator with a node list otherwise extracted from the ELF files. An entry in the node list consists of an arbitrary identifier, attributed to a functional blocks, followed by the starting address of that block in $V_1$ and $V_2$. When necessary, in describing this technique, examples based on the ARM instruction set are used. But the results are completely general and they can be easily applied, with minimal changes, to other architectures as well.

Figure 5:
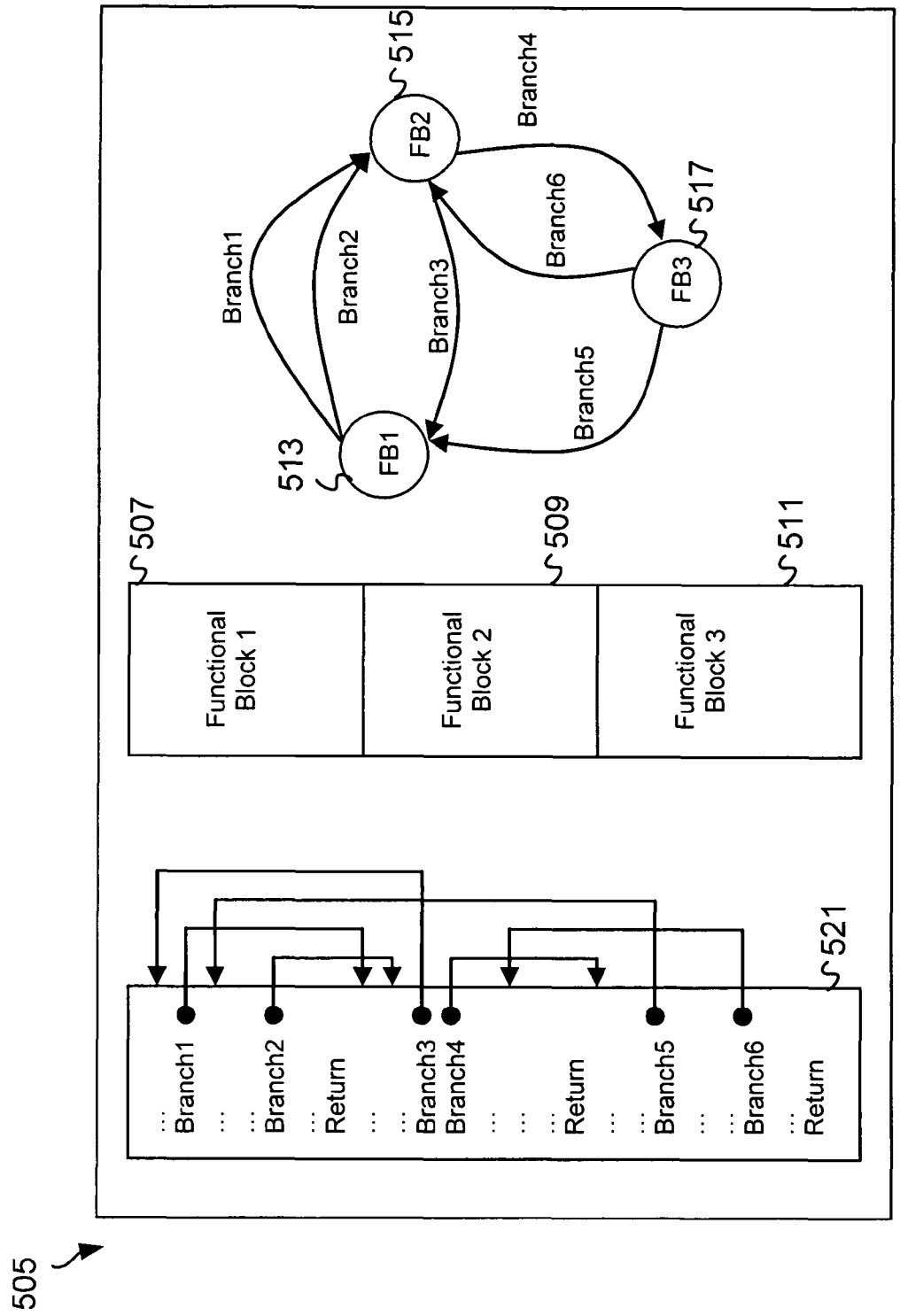
FIG. 5 is a functional block diagram showing the construction of the call graphs in the generator.

FIG. 4 shows an outline of the technique. The first step involves a full disassembly of the executable program. This is done with various techniques, mostly documented in literature. The process is not critical since errors in the disassembly will only result into a slightly worse compression. The disassembly primarily focuses on instructions implementing conditioned and unconditioned branch. The idea is to locate and collect all these instructions into a list, and from the destination of the branch infer the entry point of a possible functional block. The position of each branch in the file are recorded together with the type of branch, the absolute and the relative target addresses and a series of information characterizing the functional block to which the execution control is transferred. Each functional block is fully disassembled until its end is found. The end of a block is detected (for example) by finding the location of a return instruction or by other means: this choice may change the granularity of the matches. There is a trade off between long blocks (more reliable, but harder to match because more sensitive to changes introduced between the two versions) and short blocks. More considerations on this issue are contained at the end of this document. A non exclusive list of the information computed to characterize a functional block follows:

Address of the block in memory
CRC of the block
CRC of the block when operands of the instructions are zeroed out
CRC of the block when registers and operands of the instructions are zeroed out
Number of bytes and number of instructions in the block
Complete statistics of the instructions in the block FIG. 5 is a functional block diagram showing the construction of the call graphs in the generator. A list of functional blocks is first created from the list containing the branches (branch instructions of various kinds). This list is expected to be much smaller, since multiple branches may refer to the same functional block. Then two linked lists are added to the information collected for each functional block (CRCs, length, instruction statistics, etc.). The first contains references to branch instructions contained in the block, the second, to the branches that are referring to the block. This method creates a graph for each executable where the functional blocks are nodes, branches in the block are edges pointing out and branches referring to the node are edges pointing in.

A matching technique is also employed. Matching the call graphs generated from $V_1$ and $V_2$ helps validating the disassembly of functional blocks that have changed marginally from one version to the other. Furthermore, the list of matches can be directly converted into a node list that will be used by the generator.

In the following we indicate with $G_1=(N_1, E_1)$ and $G_2=(N_2, E_2)$ the call graphs. The matching starts by scanning the functional blocks in each call graph to tag nodes that are not unique. If two nodes in $G_1$, $N_1(i)$ and $N_1(j)$ are such that $N_1(i)=N_1(j)$, with $i!=j$, both $N_1(i)$ and $N_1(j)$ are excluded from the matching. Since we want to match the two graphs with the smallest possible number of ambiguities, non-unique nodes in each graph have to be excluded.

Once the non-unique nodes in each graph have been tagged, an empty list of matches is built. Each entry of this list will be a match and it will contain a reference to a node in $G_1$ and a reference to a node in $G_2$, plus other information like flags and an estimate of how good a match is.

The estimate field is not used in one embodiment. The current implementation compares pairs of nodes in $G_1$ and $G_2$ and adds to the match list reference to pairs that have same CRC, instruction number, instruction statistics and identical number of in and out edges. Nodes matched at this stage are tagged and do not participate to further comparisons. A second step will relax the condition by adding nodes that differ in the CRC of the block but are identical in the instruction statistics, in the number of in and out edges and in the CRC obtained by zeroing out instructions operands and registers. This criterion allows the match between functional blocks that have been relocated and/or have been compiled to use different microprocessor registers. A new match is accepted and added to the list only if is one-to-one; if there are multiple nodes matching in $G_1$ or $G_2$ the match is entirely discarded. See a discussion on this issue at the end of the document.

Upon the completion of the matching, a node list is generated. The node list will constitute the input for the generator. For each match a new entry will be added to the list. In one related embodiment, each entry will contain a unique name and the starting address of the block in $V_1$ and $V_2$.

Branch instructions provide exclusively information on the relocation of the executable code. Information on data segments encountered is added, especially information related to the relocation of the data segments. In general, data segments of two slightly different software versions $V_1$ and $V_2$ are likely to be relocated as well between the versions. Platform-dependent assembly instructions sometimes help detecting this relocation. Below, some of the discussions employ an example that uses ARM instructions, but the procedure can be applied, with minor changes, to other instruction sets as well.

ARM uses the instruction LDR to load into a register the starting address of a data segment. In its most interesting use, LDR loads into a register a pointer stored into a memory location. During the disassembly a list of LDR instructions is generated as well. The list contains the location of each LDR, the address of the pointer in memory and the location to which the pointer points to (data segment). By scanning this list and using the information provided in the list of the functional blocks and in the match list, more nodes can eventually be added to the node list.

The i-th LDR instruction in $V_j$, with $j=1$ or $j=2$ will be indicated by $LDR_{j,i}=(A_{j,i}, P_{j,i}, T_{j,i})$ where $A_{j,i}$ is its location in $V_j$, $P_{j,i}$ is the location of the pointer and $T_{j,i}$ is the content of that location. Information on the relocation of the data blocks will be added in two ways:

1) Forward LDR matching: If two functional blocks are matching exactly (same CRC), then for any LDR contained in the first functional block there will be a corresponding LDR contained in the second. The addresses of the LDR may be different because of block relocation, but $P_{1,i}=P_{2,i}$ for all i (because the blocks match exactly). From this, we can infer that the data blocks pointed by $P_{j,i}$ correspond and add a new node to the list. In forward LDR matching, the information added to the node list regards the relocation of the data blocks.

2) Backward LDR matching: If $T_{1,i}=T_{2,i}$, then the LDR are referring to data in the same memory locations (data has not been relocated from $V_1$ to $V_2$). In this case, it is possible to infer a correspondence between $P_{1,i}$ and $P_{2,i}$ and add a new node to the node list.

Entries generated by (1) and (2) are then added to the node list. Further elaboration of the node list may help to validate entries, exclude spurious entries or extend the matches to memory segments that have not been matched because of changes.

In general, CRC and instruction statistics depend of the definition of the end of a functional block. The end of a block, in one embodiment, is defined by the location of a return instruction, and in another embodiment, by the location of the next branch in the block. The choice of how to define it changes the granularity of the matches by generating functional blocks that are longer or shorter. Long blocks tend to be more reliable, but harder to match because of the increased probability of a small change being introduced. Short blocks may lead to a large number of ambiguous matches.

In one embodiment, only almost identical functional nodes are added to the match list and only if they match unambiguously. The matching is extended in a related embodiment by using the estimate field mentioned earlier. To each match (ambiguous or not) an index of reliability is attributed. At the end of the matching, a procedure inspects the list of matches and selects a subset having highest score.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A method generating an update package by a generator that generates an update package comprising delta information between an old version V1 and a new version V2 of code wherein the code is capable of being executed in mobile electronic devices, the method comprising:
preprocessing by an executable linking format (ELF) pre-processor associated with the generator update packages for a mobile electronic device including firmware that is ELF-based;
preprocessing by an non-ELF preprocessor associated with the generator update packages for a mobile electronic device including firmware that is non-ELF-based:
differencing by the generator; and
encoding by an encoder associated with the generator.

2. The method of generating of claim 1 wherein the encoding comprises:
maintaining a table, by the encoder, that stores relocations of the references encountered; and
updating the table before each COPY and after each SET_PTR with a table update method.

3. The method of generating of claim 2 wherein updating the table comprises:
copying; and
setting pointer.

4. The method of generating of claim 3 wherein copying comprises:
scanning a block for references before a block in $V_1$ is physically copied in $V_2$;
changing all references that are found in the table for which a possible relocation is known because they have appeared in the past;
keeping references unchanged if they are not found in the table;
conducting a copy of the block as needed; and
fixing the discrepancy between the blocks of the old and the new versions after the copy with the use of a command of the SET_PTR family.

5. The method of generating of claim 3 wherein copying also comprises, after each SET_PTR, adding a new entry is to the table.

6. A method of updating mobile devices in a network, comprising:
receiving to at least one mobile device having firmware that is executable linking format (ELF) based a first update package including delta information between a first version and a second version of code that has been generated using an ELF pre-processor and a difference engine; and
receiving to at least one mobile device having firmware that is non-ELF based a second update package including delta information between a first version and a second version of code that has been generated using a non-ELF pre-processor and the difference engine.

7. A mobile system, comprising:
a mobile device;
a delivery server coupled over a network to the mobile device; and
a generator to generate update packages including delta information between a first version and a second version of code, wherein the generator is coupled over the network to the delivery server, and wherein the generator includes:
an executable linking format (ELF) pre-processor;
a non-ELF pre-processor; and
a difference engine.

* * * * *

UNITED STATES PATENT AND TRADEMARK OFFICE
CERTIFICATE OF CORRECTION

| | |
|---|---|
| PATENT NO. | : 7,958,502 B2 |
| APPLICATION NO. | : 11/500754 |
| DATED | : June 7, 2011 |
| INVENTOR(S) | : Giovanni Motta et al. |

It is certified that error appears in the above-identified patent and that said Letters Patent is hereby corrected as shown below:

IN THE CLAIMS:

In column 8, line 9, in Claim 1, delete "based:" and insert -- based; --, therefor.

Signed and Sealed this
Thirteenth Day of December, 2011

David J. Kappos
*Director of the United States Patent and Trademark Office*